United States Patent [19]

Horikawa et al.

[11] Patent Number: 5,073,432
[45] Date of Patent: Dec. 17, 1991

[54] HONEYCOMB STRUCTURE AND METHOD OF PRODUCING THE SAME

[75] Inventors: Osamu Horikawa, Toyoake; Takashi Harada, Nagoya; Koichi Ikeshima, Okazaki, all of Japan

[73] Assignee: NGK Insulators, Ltd., Japan

[21] Appl. No.: 386,203

[22] Filed: Jul. 28, 1989

[30] Foreign Application Priority Data

Aug. 2, 1988 [JP] Japan ................. 63-192006

[51] Int. Cl.$^5$ .............................. B32B 3/12
[52] U.S. Cl. ......................... 428/116; 55/523; 428/188; 502/527
[58] Field of Search ............ 55/523; 428/116, 118, 428/188; 502/527

[56] References Cited

U.S. PATENT DOCUMENTS

| | | | |
|---|---|---|---|
| 3,539,387 | 11/1970 | Kelly et al. | 428/454 |
| 3,873,350 | 3/1975 | Dwyer et al. | 428/116 X |
| 3,905,775 | 9/1975 | Sowards et al. | 428/116 X |
| 4,200,468 | 4/1980 | Hurley, Jr. | 501/14 |
| 4,253,992 | 3/1981 | Soejima et al. | 428/116 X |
| 4,869,944 | 9/1989 | Harada et al. | 55/523 X |
| 4,988,483 | 1/1991 | Usui et al. | 502/527 X |

FOREIGN PATENT DOCUMENTS

| | | | |
|---|---|---|---|
| 124000 | 11/1984 | European Pat. Off. | |
| 2312794 | 9/1974 | Fed. Rep. of Germany | 428/116 |
| 62-179319 | 11/1987 | Japan | 428/116 |

Primary Examiner—Henry F. Epstein
Attorney, Agent, or Firm—Parkhurst, Wendel & Rossi

[57] ABSTRACT

A honeycomb structure as a substrate for a catalyst has at least one partially melted surface on an outer surface of the structure. A roughness of the melted surface is coarser than other surfaces. With the coarse surface, shifting of the honeycomb structure in through-aperture directions and rotation about its axis are prevented, thereby enhancing the reliability of a catalyst converter incorporating the honeycomb structure therein. A method of producing the honeycomb structure includes steps of, after extruding a ceramic batch into a honeycomb structure, drying the extruded honeycomb structure, attaching a chemical compound having a low melting point at a predetermined position onto an outer wall surface of the dried honeycomb structure, and firing the structure to melt at least a part of the outer wall surface, thereby obtaining the honeycomb structure having a melted portion whose roughness is coarser than the other surfaces of the outer wall.

4 Claims, 3 Drawing Sheets

FIG_1
PRIOR ART
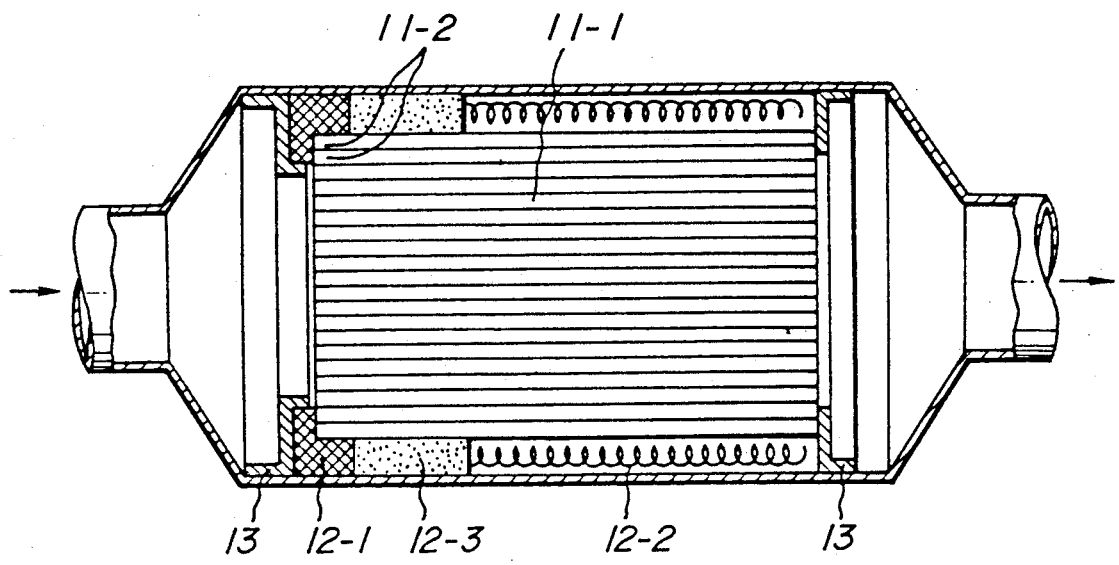
FIG_2
PRIOR ART
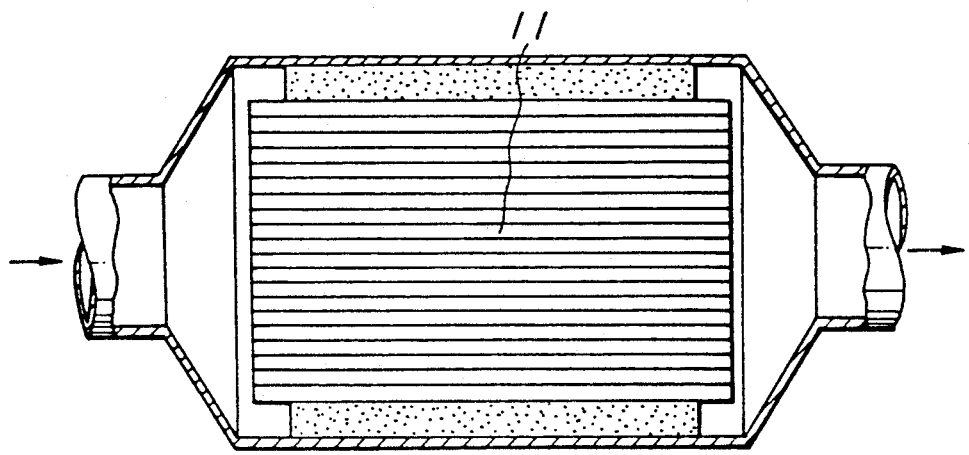

FIG_3
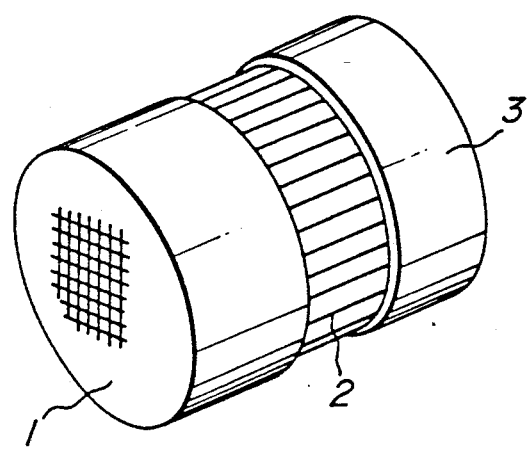
FIG_4
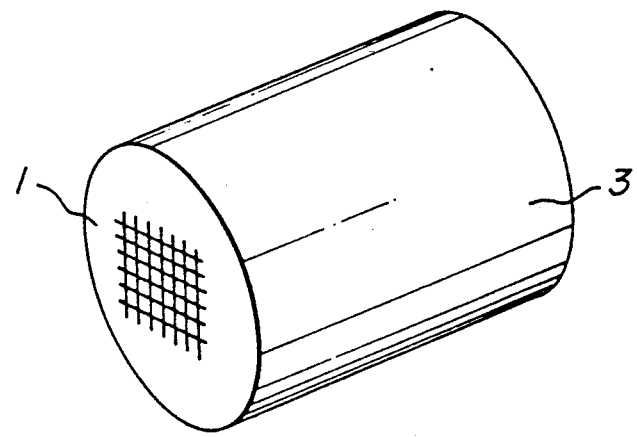

FIG._5a
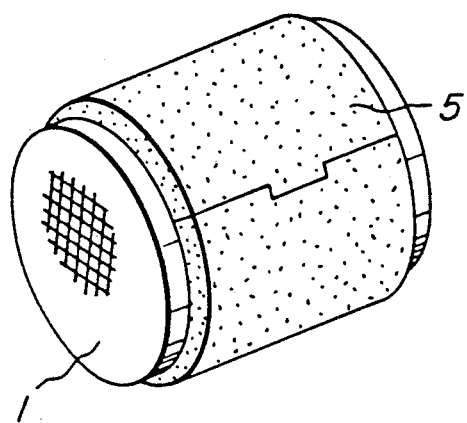
FIG._5b
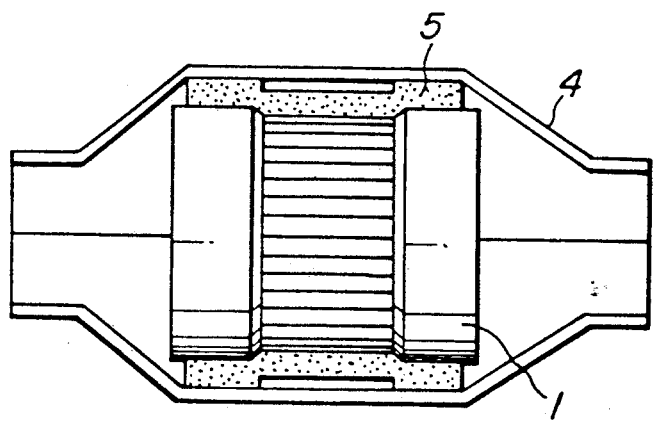

HONEYCOMB STRUCTURE AND METHOD OF PRODUCING THE SAME

BACKGROUND OF THE INVENTION

This invention relates to a honeycomb structure used as a substrate of catalysts for purifying exhaust gases from internal combustion engines, as a filter for removing fine particles in exhaust gases, and as a substrate of various catalysts for deodorizing and/or purifying burnt gases when fuels such as various gases or petroleum are burnt. More particularly, the invention relates to a method of producing such a honeycomb structure.

FIG. 1 illustrates a catalyst converter which has been generally practically used for purifying exhaust gases from an automobile loaded with the converter. In order to prevent damage to the converter during violent vibrations in use, it comprises cushion members 12-1 and 12-2 and sealing members 12-3 about a honeycomb structure having through-apertures 11-1 through which exhaust gases pass and plate members 13 on upstream and downstream sides of the structure. The cushion members and the sealing members apply forces upon the honeycomb structure in traverse or lateral directions (referred to as "radial directions" hereinafter) of the directions of the through-apertures 11-1 and the plate members 13 apply forces directly or through the cushion members 12-1 onto the honeycomb structure in the directions of the through-apertures 11-1. The honeycomb structure is fixed and held thereat in this manner.

With such a construction of the catalyst converter, however, the cushion members 12-1 or the plate members 13 close some apertures 11-2 of the through-apertures 11-1 so that exhaust gases do not pass through the apertures 11-2, with the result that the catalyst carried by the portions of the apertures 11-2 will be inoperative.

In order to avoid this disadvantage, it has been practically proposed to hold a honeycomb structure in radial directions only by seal members arranged radially outward of the honeycomb structure for the purpose of saving catalytic noble metals.

With the limitedly practically used honeycomb structure being only radially supported, however, high pressure is required to radially support the structure in order to fix it against movement or damage caused by violent vibrations generated in use. It is possible to support it radially in case that thicknesses of partition walls of the ceramic honeycomb structure are comparatively thick, for example, 0.3 mm to provide a high strength against external pressures. However, such a supporting of the honeycomb structure is not applicable to a honeycomb structure whose partition walls are relatively thin such as 0.15 mm to 0.20 mm and susceptible to external pressures. Therefore, with the prior art a honeycomb structure high in reliability could not be obtained.

SUMMARY OF THE INVENTION

It is an object of the invention to provide an improved honeycomb structure and a method of producing the structure, which eliminates all the disadvantages of the prior art and is capable of preventing any shifting of the honeycomb structure in radial and axial directions when incorporated in a catalyst converter to enhance the reliability of the honeycomb structure.

In order to achieve this object, a honeycomb structure as a substrate for a catalyst according to the invention comprises at least one partially melted surface on an outer surface of the honeycomb structure, whose roughness is coarser than other surfaces.

A method of producing a honeycomb structure according to the invention comprises steps of, after extruding a ceramic batch into a honeycomb structure, drying the extruded honeycomb structure, attaching a chemical compound having a low melting point at a predetermined position onto an outer wall surface of the dried honeycomb structure, and firing the structure to melt at least a part of the outer wall surface, thereby obtaining a honeycomb structure having a melted portion whose roughness is coarser than the other surfaces of the outer wall.

According to the above method, after extruding and drying the honeycomb structure, a compound having a low melting point is attached to a predetermined position on an outer wall surface of the structure and then the structure is fired. In this case, the part of the outer wall attached with the compound having the low melting point is somewhat melted in the step raising the temperature with the aid of an eutectic phenomenon. Therefore, the honeycomb structure having the melted surface coarser than the other surfaces can be obtained easily.

When the produced honeycomb structure is incorporated together with a sealing material in a converter, the sealing material bites into the melted surface, with the result that the honeycomb structure is firmly held in the converter to effectively prevent shifting of the structure in axial directions and rotation about its axis.

In applying the compound having the low melting point, it is preferable to spray or coat a slurry of talc, magnesium salt or a mixture of these compounds or attach a tape impregnated with such a slurry or an adhesive tape impregnated with a filler having a low melting point.

The invention will be more fully understood by referring to the following detailed specification and claims taken in connection with the appended drawings.

BRIEF DESCRIPTION OF THE DRAWINGS

FIGS. 1 and 2 are sectional views illustrating examples of catalyst converters of the prior art;

FIG. 3 is a perspective view illustrating one embodiment of a honeycomb structure according to the invention;

FIG. 4 is a perspective view showing one example of honeycomb structures of Comparative example used in comparative tests; and FIGS. 5a and 5b are a perspective and a sectional view for explaining incorporation of the honeycomb structures according to the invention into vessels as catalyst converters which were used in the tests.

EXPLANATION OF THE PREFERRED EMBODIMENTS

FIG. 3 illustrates in a perspective view a construction of one embodiment of the honeycomb structure according to the invention. In the embodiment shown in FIG. 3, an outer circumferential surface of a cylindrical honeycomb structure 1 is caused to partially chemically react over its circumferentially overall area so as to be melted so that a melted portion 2 is provided whose surface roughness is coarser than the other surface portions 3.

Such a honeycomb structure as shown in FIG. 3 is obtained as follows. After extruding a ceramic batch having a predetermined composition, the extruded honeycomb structure is dried to obtain a dried structure. A chemical compound having a low melting point is then attached at a predetermined location onto the outer surface of the dried honeycomb structure. Thereafter, the honeycomb structure is fired to obtain the structure having the part whose surface roughness is coarser than the other surface portions.

Any chemical compounds to be attached to the dried ceramic honeycomb structure can be used without particularly limiting compositions so long as they are melted at temperatures relatively lower than their firing temperatures. A slurry of talc, magnesium salt or a mixture of these compounds is preferably used for this purpose.

How to attach the chemical compound to the dried ceramic honeycomb structure is not particularly limited. Methods preferable owing to simplicity are spraying and coating a slurry of the talc, kaolin or a mixture of these compounds, or attaching a tape or adhesive tape impregnated with such a slurry or a filler having a low melting point. Actual examples will be explained hereinafter.

On the other hand, a conventional cordierite was extruded and fired to obtain honeycomb structures of Comparative examples 1 and 2 as shown in FIG. 4 having 100 mm diameters, 100 mm overall lengths, densities of through-apertures of 46.5/cm$^2$ and thicknesses of partition walls of 0.2 mm. Honeycomb structures of comparative example 3 were prepared which were substantially the same as those of Comparative examples 1 and 2 with exception of thicknesses of partition walls of 0.23 mm. The Comparative examples 1 and 2 were extruded and fired simultaneously with those of Embodiments 1 and 2 products in the same lot.

These honeycomb structures of the Embodiments 1 and 2 and Comparative examples 1, 2 and 3 were incorporated through ceramic mats 5 as shown in FIGS. 5a and 5b in vessels 4 as shown in FIGS. 1 and 2 and subjected to various performance tests whose results are shown in Table 1.

TABLE 1

| Kind | | Strength against external pressure*$^3$ Kg/cm$^2$ | Strength against thermal shock °C. | Canning test X Damaged ○ Sound | Heated vibration test | | |
|---|---|---|---|---|---|---|---|
| | | | | | Construction of can | Clearance*$^1$ mm | Axial shifting*$^2$ |
| Structure with melted outer wall | Embodiment 1 | 25–30 | 900 | X | FIG. 5b | 3.5 | ○ |
| | Embodiment 2 | 21–28 | 900 | X | FIG. 5b | 3.5 | ○ |
| Conventional structure | Comparative example 1 | 20–31 | 900 | X | FIG. 2 | 3.5 | X |
| | Comparative example 2 | | | | FIG. 1 | 3.5 | ○ |
| | Comparative example 3 | 78–96 | 875 | ○ | FIG. 2 | 2.2 | ○ |

Note
*$^1$Clearance between can and structure
*$^2$X Axially shifted, ○ not shifted
*$^3$Damages of the structures of Embodiments in the external pressure tests occurred at non-melted portions of outer wall surfaces.

EXAMPLE

In order to obtain honeycomb structures of Embodiment 1 according to the invention, after extruding a cordierite into a honeycomb structure, an adhesive tape impregnated with constituents of alkali earth elements was attached at a center of an outer wall having a width of 25 mm over its circumferentially overall area and then fired as shown in FIG. 3. As the tape was impregnated with talc including magnesium as a main component, the outer wall corresponding to the tape was melted with the aid of an eutectic phenomenon caused by the impregnated compound.

The fired honeycomb structure had an outer diameter of 100 mm, an overall length of 100 mm, a density of through-apertures of 46.5/cm$^2$, partition wall thicknesses of 0.20 mm and thicknesses of the non-melted outer wall of approximately 0.3 mm.

In order to obtain honeycomb structures of Embodiment 2 according to the invention, after extruding in the same manner as in the Embodiment 1, a slurry of talc dissolved in water and added with a small amount of a binder was coated on the honeycomb structure at a center of an outer wall thereof having a width of 25 mm over its circumferentially overall area and then fired. As a result, the outer wall corresponding to the coated slurry was melted by firing.

In the external pressure strength tests, aluminum plates having a thickness of about 20 mm were applied through urethane sheets having a thickness of about 0.5 mm to end surfaces of a honeycomb structure and a circumferential surface of the structure was hermetically surrounded by an urethane tube having a wall thickness of 0.5 mm. The honeycomb structure was accommodated in a vessel filled with water, and then the pressure in the vessel is raised slowly. The pressure in the vessel when a sound was generated due to damage of the honeycomb structure was measured. Test pieces in the test were three.

In thermal shock tests, a ceramic honeycomb structure was arranged on a frame on which a metal wire was arranged and inserted into an electric furnace kept at 800° C. After a lapse of one hour, it was taken into a room out of the furnace whose outer surfaces were then slightly stuck by a thin wire, while observing outer appearances by eyes.

In case that cracks were not found by the observation by the eyes and only metallic sound was heard, the honeycomb structure was kept in the room for one hour until the structure was cooled to the room temperature. Thereafter, the structure was inserted into the furnace kept at a temperature 50° C. higher than the room temperature. Such a cooling and a heating operation were repeated until the honeycomb structure was damaged. An occurrence of the damage of the honeycomb structure was determined by the fact that cracks were observed or the sound of the structure by the thin wire varied into a thick or dull sound. The strength against thermal shock was indicated by the maximum high temperature at which the structure had not been damaged. In the test, two of test pieces of each of the Embodiments and Comparative examples were tests and average values were used.

In canning tests, a ceramic mat as a holding member was wound about a honeycomb structure and this assembly was inserted in a jig. The jig had an inlet whose inner diameter was larger than that of an outlet of the jig to form a tapered jig. The inner diameter of the outlet of the jig was substantially the same as an inner diameter of an inlet of a can. The outlet of the jig was substantially the same as an inner diameter of an inlet of the can. The outlet of the jig was attached to the inlet of the can and the honeycomb structure was force into the can by means of a hydraulic ram. After the honeycomb structure was removed out of the can, an external appearance of the structure was observed. The ceramic mat had a thickness of 4.9 mm. The inner diameter of the can was 104.4 mm. Two test pieces were used for each of those of the Embodiments 1 and 2 and Comparative examples 3, 4 and 5.

In the heated vibration tests, a holding member was wound about a honeycomb structure and the assembly was forced into a can having an inner flange welded thereto forming a clearance between the honeycomb structure and the can. Thereafter, hollow conical members were bolted to both ends of the can and tested.

As tested conditions, a heated gas heated at 800° C. by means of a propane burner was caused to flow against the can for two minutes so as to heat the honeycomb structure. Then air at room temperature was caused to flow against the can for two minutes so as to cool the honeycomb structure. One cycle formed by such a heating and a cooling was repeated to 50 cycles while the can was subjected to vibrations of 0–20 g with 200 Hz. Thereafter, the hollow conical members were removed from the can from which the honeycomb structure was removed to observe an external appearance of the structure. Test pieces in the test were two.

From the above Table 1, it has been found that mechanical and thermal strengths of a honeycomb structure are not lowered even if it is subjected at its circumferential portion to the melting treatment according to the invention, and that the honeycomb structures according to the invention can sufficiently resist to the heated vibration test simulated as actually used conditions even if it has a relatively low strength against external forces and is supported only by lateral surfaces so that the effectiveness of the invention can be ascertained.

It is to be understood that the invention is not limited to the above embodiments and various changes and modifications may be made in the invention without departing from the scope of the invention. For example, sizes, configurations and areas of the melted surface portions according to the invention are not limited to those illustrated and explained because they are of design choice to be determined by using conditions and widths in through-aperture directions of cushion members abutting against the melted portion.

Although the cross-sectional shape of the ceramic honeycomb structures is correctly circular in the above embodiments, it is not limited to circular and may be for example elliptical. Moreover, the sectional shape of cells of the honeycomb structures are not limited to square as in the embodiments and the material thereof is not limited to cordierite used in the above embodiments. Furthermore, both ends of through-apertures of the honeycomb structures may of course be alternately closed.

As can be seen from the above description, the invention easily provides a honeycomb structure having at least one part of the outer wall surface thereof as a melted surface whose roughness is coarser than the other surfaces so that shifting in through-aperture directions and rotation about its axis are prevented, thereby enhancing the reliability of a catalyst converter incorporating the honeycomb structure therein.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A cylindrical ceramic honeycomb structure comprising an outer surface wall surrounding and encompassing a plurality of partition walls and through-holes, at least one portion of said outer surface having a coarser surface roughness than a remaining portion of said outer surface resulting from partial melting of said at least one portion of said outer surface.

2. The honeycomb structure of claim 1, wherein said honeycomb structure is cylindrical and said at least one portion extends circumferentially around said honeycomb structure at a position located substantially axially midway between opposite ends of said honeycomb structure.

3. The honeycomb structure of claim 2, wherein said at least one portion extends entirely around said honeycomb structure.

4. A catalyst converter comprising the honeycomb structure of claim 1 arranged in a converter can and a ceramic mat arranged between said honeycomb structure and an inner surface of said converter can.

* * * * *